United States Patent [19]

Tuley

[11] 4,276,816
[45] Jul. 7, 1981

[54] WIND PROPELLED FAN

[76] Inventor: Bertha L. Tuley, 850 Maddox St., LaBelle, Fla. 33935

[21] Appl. No.: 7,050

[22] Filed: Jan. 29, 1979

[51] Int. Cl.³ ............................................. B60H 1/24
[52] U.S. Cl. ......................................... 98/23; 98/34; 98/69; 98/72; 416/32; 416/171
[58] Field of Search .................. 98/23, 72, 15, 21, 34; 416/171, 197 A, 41, 52, 32; 192/56 R, 43.12, 89 W, 150, 43.1

[56] References Cited

U.S. PATENT DOCUMENTS

| 752,764 | 9/1903 | Dunne | 416/197 A |
| 1,017,219 | 2/1912 | Keator | 192/56 R |
| 1,327,879 | 1/1920 | Pruden | 98/72 |
| 1,367,766 | 2/1921 | Bozied | 416/197 A |

FOREIGN PATENT DOCUMENTS 146031  7/1920  United Kingdom ................ 416/197 A Primary Examiner—Albert J. Makay
Assistant Examiner—Henry Bennett
Attorney, Agent, or Firm—Alfred E. Wilson

[57] ABSTRACT

An interior ceiling type fan operated by a wind propelled squirrel cage rotor, rotatably mounted atop the roof of a structure, with an axially extending drive shaft therefrom extending downwardly through the roof of the structure, such as a building, trailer, etc., with the multi-bladed ceiling fan fixed to the distal end thereof within the inner area of the structure.

1 Claim, 3 Drawing Figures

WIND PROPELLED FAN

BACKGROUND OF THE PRESENT INVENTION

The present invention pertains to a wind propelled fan of a type which requires minimal wind forces for actuation thereof. Because of the fuel shortage and very high utility bills resulting therefrom, ceiling fans of a type, commonly in use many years ago are becoming more popular and in demand because of the greatly reduced cost of operation thereof relative to air conditioning.

The present invention pertains to a ceiling fan which utilizes wind forces for operation, more particularly it provides a multi-bladed ceiling fan with an axial drive shaft extending vertically upwardly therefrom, and outwardly through the roof of a structure, with a wind motor in the form of a squirrel cage rotor, fixed to the outwardly extended portion thereof to supply the power to cause rotation of the fan.

Therefore, one of the principal objects of the present invention is to provide a ceiling fan for mounting within the interior area of a structure, such as a building, trailer or the like, with a drive shaft thereof extending outwardly through the roof of the structure in a driven connection to a squirrel cage type of wind motor or rotor.

A further object of the invention is to provide means to limit the degree of rotational speed imparted to the fan by the wind motor.

DETAILED DESCRIPTION OF THE EMBODIMENT

Figure 1:
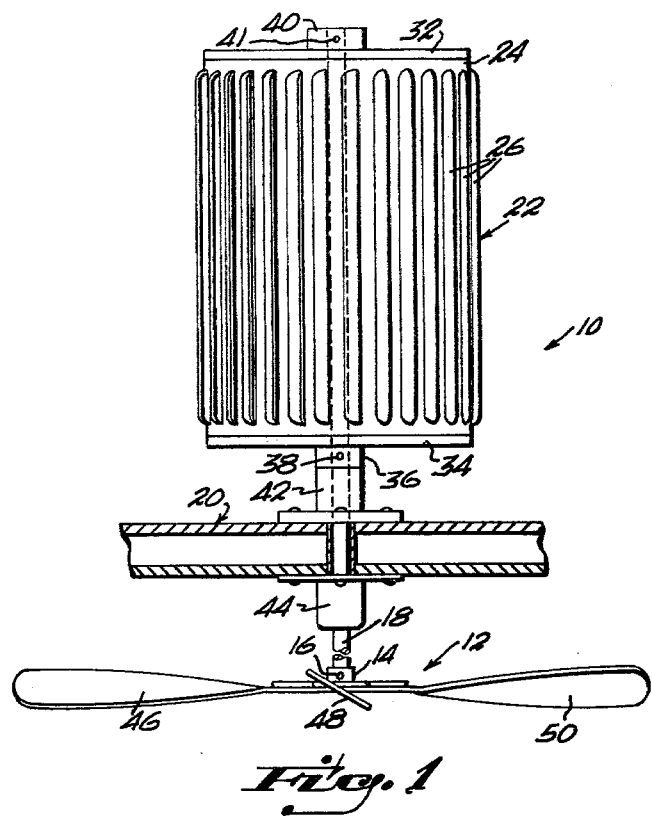
FIG. 1 is a fragmentary vertical sectional view through the roof of a building structure, illustrating the wind propelled fan of the present invention.
Figure 2:
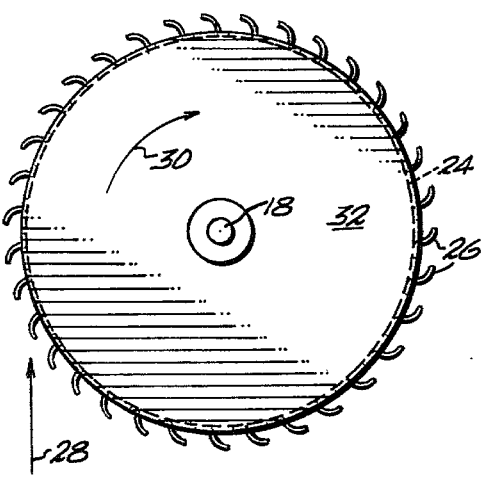
FIG. 2 is a top plan view of the squirrel cage rotor utilized to rotate the fan.

With reference to the drawings in which like reference characters designate like or corresponding parts throughout the several views, and with particular reference to FIG. 1, the wind propelled fan structure, designated generally at 10, includes a fan assembly 12 including an axially disposed hub 14, fixed at 16 to a drive shaft 18, extending upwardly through any conventional roof structure 20 to a squirrel cage wind rotor 22. Rotor 22 includes a main circumferential drum 24 with a plurality of parallel, vertically extending vanes 26, arcuately configurated to operate the rotor 22 in a conventional manner. For example, arrow 28, indicates the wind direction which results in the rotor turning in the direction of arrow 30.

A pair of top and bottom end closure plates 32, 34 are fixed to the drum 24, the bottom end plate 34 includes a bottom hub 36 pinned at 38 to shaft 18 and a top hub 40 carried by top end plate 32 is pinned at 41 to the drive shaft 18. Shaft 18 extends from rotor 22 through bearing mounts 42, 44, fixed respectively to the outer and inner surfaces of the roof structure 20. The fan assembly 12 includes a plurality of radially outwardly extending, properly pitched blades, three illustrated at 46, 48 and 50.

Therefore, it can be seen that the blades 46, 48, 50 rotate in direct response to the rotational wind rotor 22.

Figure 3:
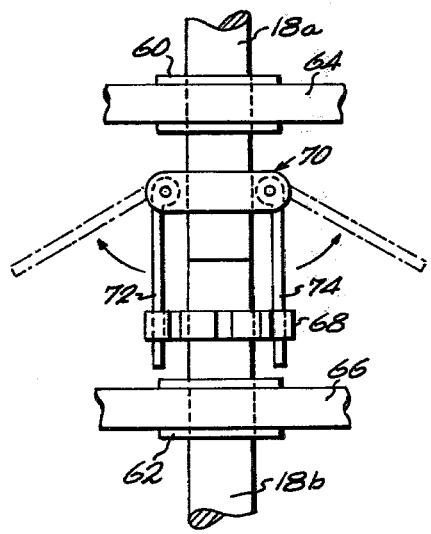
FIG. 3 is an enlarged fragmentary elevational view of a portion of the drive shaft within the rotor, illustrating one form of ratchet and pawl means to automatically disconnect the drive connection between the rotor and fan when the wind velocity increases beyond a predetermined degree.

Fan speed limiting means are illustrated in the modification embodied in FIG. 3 wherein the drive shaft is divided into upper and lower portions 18a and 18b. In this instance, the hub 36 comprises a collar pinned at 38 to lower shaft portion 18b and freely supports the rotor assembly 22 thereon. The upper shaft portion 18a is fixed at its top end to hub 40 by pin 41 to rotate the rotor 22. A pair of additional bearings 60, 62, provided for the respective shaft portions 18a and 18b, are carried in intermediate plates 64, 66, fixed within rotor 22. Fixed adjacent to the top end of lower shaft portion 18b is a ratchet member 68, and a pawl assembly 70, fixed adjacent to the lower end of upper shaft portion 18a, includes one or more vertically pivotal pawls, two illustrated at 72, 74. Under normal wind forces, the pawls 72, 74 engage the ratchet 68, illustrated in full line, to form a drive connection from the wind rotor to the fan assembly 12. Under severe or strong wind forces, centrifugal forces disengage pawls 72, 74 from ratchet 68, breaking the drive connection to the fan assembly 12, illustrated in dot-dash lines, and if desired the drive connection can be locked out to interrupt the operation of the fan.

I claim:

1. A wind propelled fan assembly for mounting through the roof of a building structure comprising, a multi-bladed fan structure disposed within an existing interior area of the structure and fixed to the lower end of a vertical drive shaft, said drive shaft being rotatably supported relative to the roof and with an extended portion upwardly outwardly a predetermined distance above the roof, a squirrel cage rotor, including a vertically extending drum with a plurality of parallel longitudinally extending circumferentially spaced apart vanes thereabout, upper and lower drum end closure plates with axially aligned center holes for through passage of said extended portion, means to fix said extended portion to said squirrel cage rotor comprising a hub fixed to each of said upper and lower end closure plates with said drive shaft passing therethrough in a pinned relation therewith, said drive shaft being divided centrally of the squirrel cage into separate upper and lower axially aligned drive shaft portions, with said multi-bladed fan structure fixed to a bottom end of said lower portion, said means to fix comprising a hub fixed to said upper end closure plate with said upper drive shaft portion extending therethrough in a pinned relation therewith whereby said upper drive shaft portion and squirrel cage rotor rotate in unison under the influence of wind forces, speed control means to limit the rotational speed of the fan, including a ratchet, fixed about an upper end portion of said lower drive shaft portion, vertically pivoted normally depending pawl means fixed to a lower end portion of said upper drive shaft portion in a manner whereby said pawl means depends under gravity forces into driving engagement with said ratchet to drive said lower drive shaft portion with said multi-bladed fan under the influence of normal wind forces, and said pawl means being pivoted upwardly and outwardly out of engagement with said ratchet means by centrifugal forces under the influence of abnormally severe wind forces to reduce the drive connection to said lower drive shaft portion and multi-bladed fan to limit the rotational speed of the fan.

* * * * *